(12) United States Patent
Grierson, Sr.

(10) Patent No.: US 8,869,413 B2
(45) Date of Patent: Oct. 28, 2014

(54) FORKLIFT/MATERIAL HANDLING FORK LEVEL INDICATOR

(76) Inventor: Gregory Michael Grierson, Sr., Dayton, OH (US)

( * ) Notice: Subject to any disclaimer, the term of this patent is extended or adjusted under 35 U.S.C. 154(b) by 0 days.

(21) Appl. No.: 13/341,220

(22) Filed: Dec. 30, 2011

(65) Prior Publication Data

US 2012/0198713 A1     Aug. 9, 2012

Related U.S. Application Data

(60) Provisional application No. 61/457,139, filed on Jan. 11, 2011.

(51) Int. Cl.
*G01C 9/02* (2006.01)
*B66F 9/075* (2006.01)
*B66F 9/08* (2006.01)

(52) U.S. Cl.
CPC ............... *G01C 9/02* (2013.01); *B66F 9/0755* (2013.01); *B66F 9/082* (2013.01)
USPC .............................................. 33/371; 33/391

(58) Field of Classification Search
USPC ........................................ 33/371, 333, 391
See application file for complete search history.

(56) References Cited

U.S. PATENT DOCUMENTS

| | | | | |
|---|---|---|---|---|
| 3,883,021 A * | 5/1975 | Wilhelm | | 33/370 |
| 4,669,195 A * | 6/1987 | Griffin | | 33/369 |
| 5,956,855 A * | 9/1999 | Foss et al. | | 33/371 |
| 6,941,666 B2 * | 9/2005 | Parish | | 33/391 |
| 6,981,331 B1 * | 1/2006 | Poe et al. | | 33/397 |
| 8,157,500 B1 * | 4/2012 | Husmann | | 414/635 |
| 2005/0072010 A1 * | 4/2005 | Parish | | 33/333 |
| 2012/0198713 A1 * | 8/2012 | Grierson | | 33/371 |

\* cited by examiner

*Primary Examiner* — Yaritza Guadalupe-McCall
(74) *Attorney, Agent, or Firm* — Gregory Michael Grierson

(57) ABSTRACT

Forklift and material handling procedures involve many safety, productivity, and efficiency constraints. Foremost among these is the inability of equipment operators to accurately determine the alignment of equipment forks to the material or vessle being handled. The "Forklift/Material Handling Fork Level Indicator" described herein, eliminates this problem. By employing a rearward facing baseplate, mirror, indicator needle, and graduated scale, the equipment operator can literally "see around a corner" to easily determine equipment mast vertical condition, fork to floor parallelism, and thus accurate alignment of equipment forks to pallets, skids, or other shipping and storage containers upon approach to, or withdrawl from said vessles. Installed on the side of the main vertical mast of material handling equipment, this device provides a side view of the main mast position, via the freely rotating indicator needle, directly to the operator while in normal operating position.

3 Claims, 5 Drawing Sheets

Figure 1:
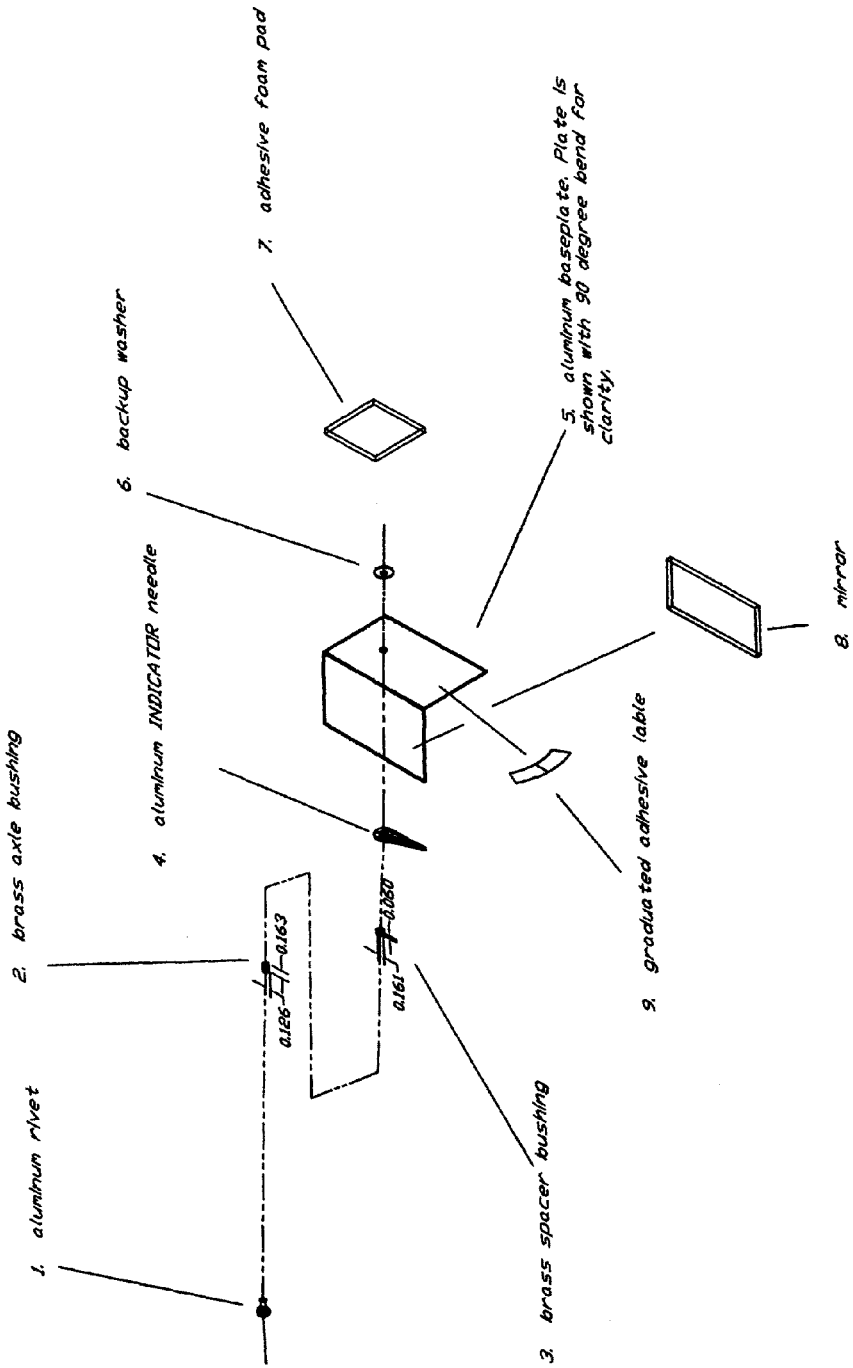

Detail view showing assembly of baseplate, rivet, spacer and axle bushings Indicator needle, and backup washer.

section AA

Blowup View of rivet and bushing assembly

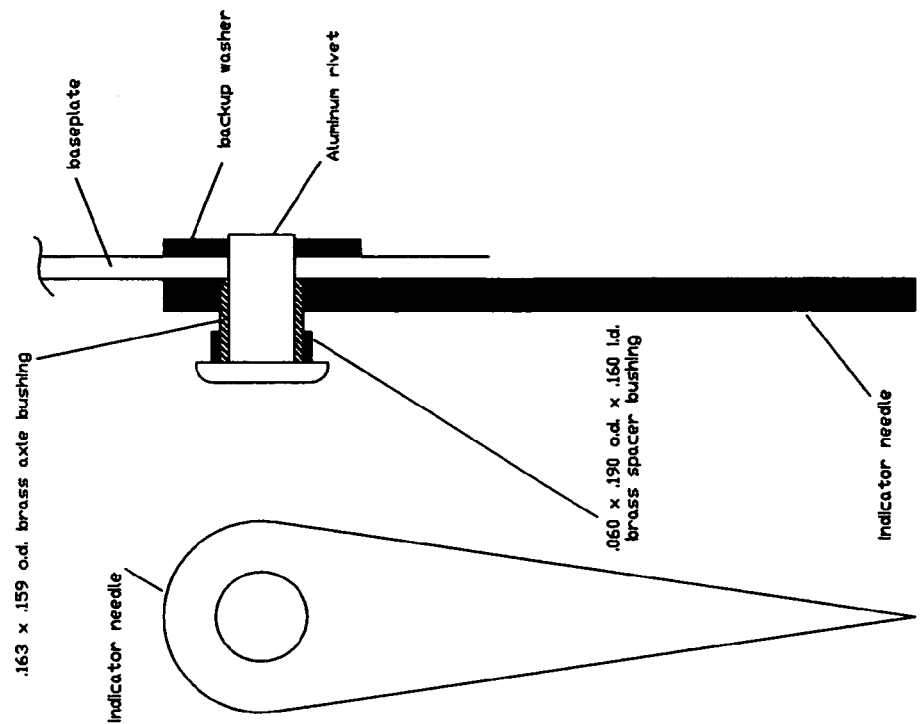
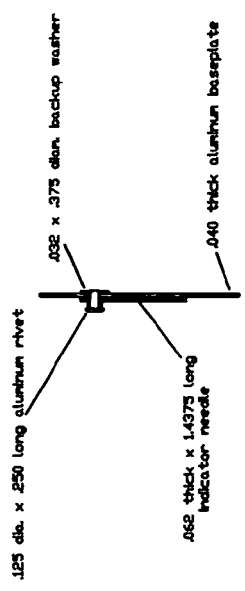
fig 3
Detail view showing assembly of baseplate, rivet, spacer and axle bushings Indicator needle, and backup washer.

fig 4

Installation and Needle positions

The forklift fork level indicator is installed in this area of the main forklift mast.

Operator's line of sight.

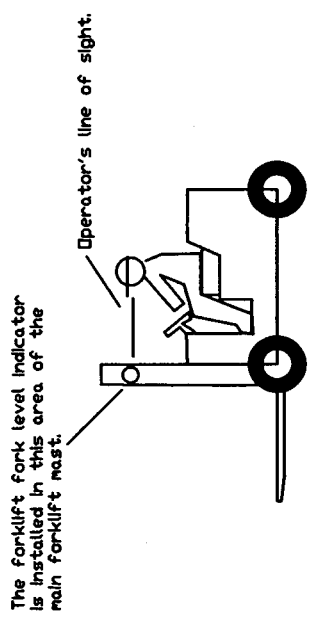

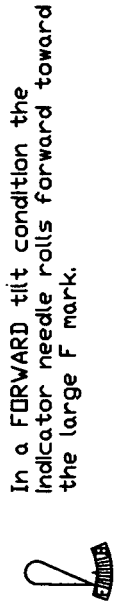
In a FORWARD tilt condition the indicator needle rolls forward toward the large F mark.

In a PLUMB and hence, LEVEL condition the indicator needle rolls toward the CENTER mark.

In a BACKWARD tilt condition the indicator needle rolls BACK toward the large B mark.

NOTE* The large "F" and "B" marks are printed in reverse, and appear normally when reflected toward the operator in the mirror.

Adhesive lable with reversed text.

FORKLIFT/MATERIAL HANDLING FORK LEVEL INDICATOR

BRIEF SUMMARY

This invention provides a visual indication that the forks or loading surfaces of a forklift, loader, pallet handler, or other material handling equipment are in the state of being level to the floor and thereby to the structures and/or loading slots or tubes of skids, pallets, and/or bins and vessels being picked, loaded or set into storage areas, onto trucks, freight cars or any other storage or transport apparatus. This invention provides this visual indication DIRECTLY to the operator of such equipment in real-time, minimizing the need continually 'lean out' to repeatedly adjust the position of the forks for entry into each pallet slot, etc. as mentioned above, greatly improving speed and efficiency at the pickup location. The invention also allows the operator to adjust the forks to the level conditon while in motion to each successive pick, permitting instant alignment with the loading slots, pallets, etc. thereby allowing greatly improved speed and efficiency in high volume applications, while greatly increasing safety of the operator and those around him. The invention also eliminates the need for a spotter to direct the forklift operator regarding adjustments to fork position, thereby reducing cost, and the risk of injury to the spotter. By providing level entry into loading equipment, pallets, etc. the forklift operator greatly reduces misalignment, which can result in "push-offs" where the forks grab or rub the pallets, skids, etc. and greatly reduce spills and/or damage to the materials being handled as the forks approach from an aligned position. In essence, the device allows a rapid, reliable, real-time indication that the forks on material handling equipment are in a safe alignment to the ground, to the material being processed, and provides this visual information DIRECTLY to the operator from his or her operating position. The device is purely mechanical, relying only on light and gravity. This simple design eliminates the need for batteries, wires, uploads, downloads or apps. By employing simple, mechanical means, reliability is preserved and lower development costs make the device very affordable and cost efficient. The unique feature of this invention is that it provides the operator with a SIDE VIEW of the fork lift mast while seated in the normal operating position!

THE INVENTION

The invention is an assembly of a small aluminum plate (approximately 3"×3") with the thickness of approximately 1 mm. This plate is bent at approximately 45 degrees (see FIG. 2 Top View) with the bend running vertically to the floor, at the baseplate centerline, creating a baseplate with two opposing surfaces, resembling a partially opened book. One of these surfaces attaches to the material handling equipment mast (the inboard baseplate surface, see FIG. 1 component 5 and 7), and the other surface (the outboard baseplate surface) protrudes outward, and rearward at an angle back toward the operator's line of sight. Because the lower main mast of material handling equipment is hinged and articulates from the frame of said equipment, this main mast remains at a fixed height regardless of how high the load is lifted, therby affording visual access to the invention regardless of how high the load is lifted. Mounted to the outboard inside bend surface of the invention is a small mirror, adhered with standard 100% silicone caulk (see FIG. 2 component 8). On the opposite surface, the inboard surface (the surface attached to the forklift mast) is a small indicator needle (see FIG. component 4.) made of approximately 2 mm thick aluminum painted in a highly visible color. This needle is attached through a hole on this inboard surface by a rivet, bushings, and washer assembly, allowing for free movement along a graduated label adhered below the needle indicating forward, backward, or level tilt condition of the forks. A large reversed text F and B printed at each end of the graduated scale (see FIG. 4 and FIG. 5) reflects back clear indication to the forklift operator of the tilt condition of the forks. These marks would indicate 'F'orward, 'B'ack or level (the center mark), or any amount of tilt relative to the graduations along the scale. Additionally, because floor level conditions may vary within the material handling envelope, the operator can make mental notes of needle position relative to floor conditions, or simply adjust forks to level on level surfaces, and readily make use of the device (over time) even in areas where the floor may not be level. Because material handling equipment varies greatly in size from machine to machine, obviously, the basic design may be enlarged to fit each size requirement, and due to cost and weight considerations, plastics and other materials may be employed in either the entire design or some of its components. The entire assembly is then mounted to the outermost mast of the material handling equipment (see FIG. 4), with pre-attached high strength double-sided foamed adhesive tape, and when attached, provides a reflected image of the needle back toward the operator and indicates the tilt condition of the forks. This provides visual assurance that the forks of the equipment are in a true horizontal and SAFE orientation to the floor surface. The device can be manufactured in both left hand and right hand mounting orientations, and labels would be printed with multi-lingual considerations.

To my knowledge this is a totally new invention and thereby does not require distinction from other inventions.

MANUFACTURE

The baseplate may be fabricated utilizing a bad saw, shear, or blanking punch press to cut out the baseplate, and bend the baseplate at a pre-set (approximately 45 degree) angle. After de-burring and cleaning, the left, outer surface of the invention retains a small mirror, (provided by an outside source), with application of 100% silicone adhesive caulk between the rear side of the mirror and the baseplate. The indicator needle, sawn or die punched from approximately 2 mm thick aluminum and provided with a punched or drilled hole is then attached through a hole in the baseplate on the surface opposite and opposing the mirror. The indicator needle is painted safety red, yellow, or orange to provide a readily observable plumb condition of the needle along a pre-printed graduated adhesive backed lable that is affixed to the baseplate directly below the needle. An assembly of two bushings, cut and de-burred from standard size hobby grade brass tubing, and a ⅛" diameter by ¼" long rivet and washer complete the basic design. 1 axle bushing, when placed over the rivet holds the rivet head at a fixed distance from the baseplate. 1 spacer bushing, placed between the rivet head and the needle holds the needle in close proximity to the baseplate but allows free movement of the indicator needle (see FIG. 3 blowup view). The washer provides a strong and durable attachment for the rivet. High strength double-sided adhesive foamed-back tape, readily avalable and cut from stock, applied to the rear side of the needle side of the baseplate completes the design. A hole in the center of the foam tape to accommodate the rivet and washer would ensure firm bonding of the invention to the material handling main mast.

In high volume assembly the use of locating fixturing and positioning equipment would be employed to ensure proper positioning of components during assembly. The device would then be packaged on a typical clear plastic vacuum-formed packaging bubble and card for distribution and sale.

INSTALLATION AND USE

Installation begins with the thorough solvent cleaning of the outboard surface of the material handling equipment mast with alcohol or similar cleaning solution in an area of the mast away from hoses etc. and at a height near or at the average operator's line of sight (see FIG. 4). By employing the use of a bubble level placed on the top flat surface and along the length of the equipment forks, the forks are adjusted with the tilt lever to a level, and hence mast vertical or plumb condition. With the use of an assistant the pre-attached adhesive tape backing is removed and the invention is secured to the forklift mast taking care to allow the operator, (while in normal operating posistion) to sight and to convey proper needle to label orientation to the assistant to ensure accurate and plumb installation of the invention to the mast. After installation the operator would then verify the accuracy of the installation by testing the fork positions relative to various skids and/or pallets within the work envelope. The invention could be adjusted at this point to fine tune installation with respect to mast positioning and bend angle considerations before full bonding of the adhesive tape is still workable. Initially, the operator would approach a pallet or skid, adjust the tilt to indicate plumb mast orientation, (the needle centered on the central label graduation), verify proper fork alignment and enter the pallet with the forks, tilt back the forks, lift and transport the load to it's drop off position and set the load and withdraw the forks. The operator can then ADJUST THE FORKS WHILE PROCEEDING to the next skid or pallet being picked. Because the forks are ALREADY LEVEL when arriving at the next item a much more efficient and SAFE, and rapid process is facilitated! As noted above varying floor conditions may require remembering needle position relative to floor surface on ramps etc. but, basically once leveled to a level surface the forks will always be parallel to the floor surface in any location no matter what level or slanted characteristics the floor may have. While this invention does not eliminate the need to verify the fork position for entry into skids, pallets, or bins it does ensure much SAFER and greatly increased productivity in high volume material handling applications by providing on-the-fly ability to adjust fork level condition by the operator while in normal seated driving position.

SAFETY CONSIDERATIONS

Because material handling procedures result in roughly 20,000 to 70,000 accidents anually, as indicated by OSHA general statistics, I feel the use of this invention would have a MAJOR impact in REDUCING and even PREVENTING many of these injuries and I foresee the invention possibly becoming a REQUIRED safety device on material handling equipment in the future.

Statement that the Sustitute Specification Contains No New Matter

The specification herein enclosed contains no new matter. Margin and spacing issues were addressed as were any additions underlined. A clean version with no markings is also enclosed.

DESCRIPTION OF THE SEVERAL DRAWINGS

FIG. 1 Exploded isometric view of the invention showing the orientation and assembly order of the component parts of the device. The aluminum rivet, 1. is fitted with the axle bushing, 2. A second bushing, the spacer bushing, 3. is then placed over the rivet and axle bushing. This holds the indicator needle, 4. in close proximity to the baseplate, 5. After passing through the baseplate, the rivet is secured by a backup washer, 6. providing a strong and durable attachment. A graduated adhesive label, 9. affixed below the indicator needle relates fork position relative to plumb condition by reflecting the needle position to the operator in the mirror, 8. An adhesive backed foam tape pad, 7. allows the device to be mounted to the mast of the material handling equipment providing a SIDE VIEW of the mast to the operator while seated in the normal operating position.

Figure 2:
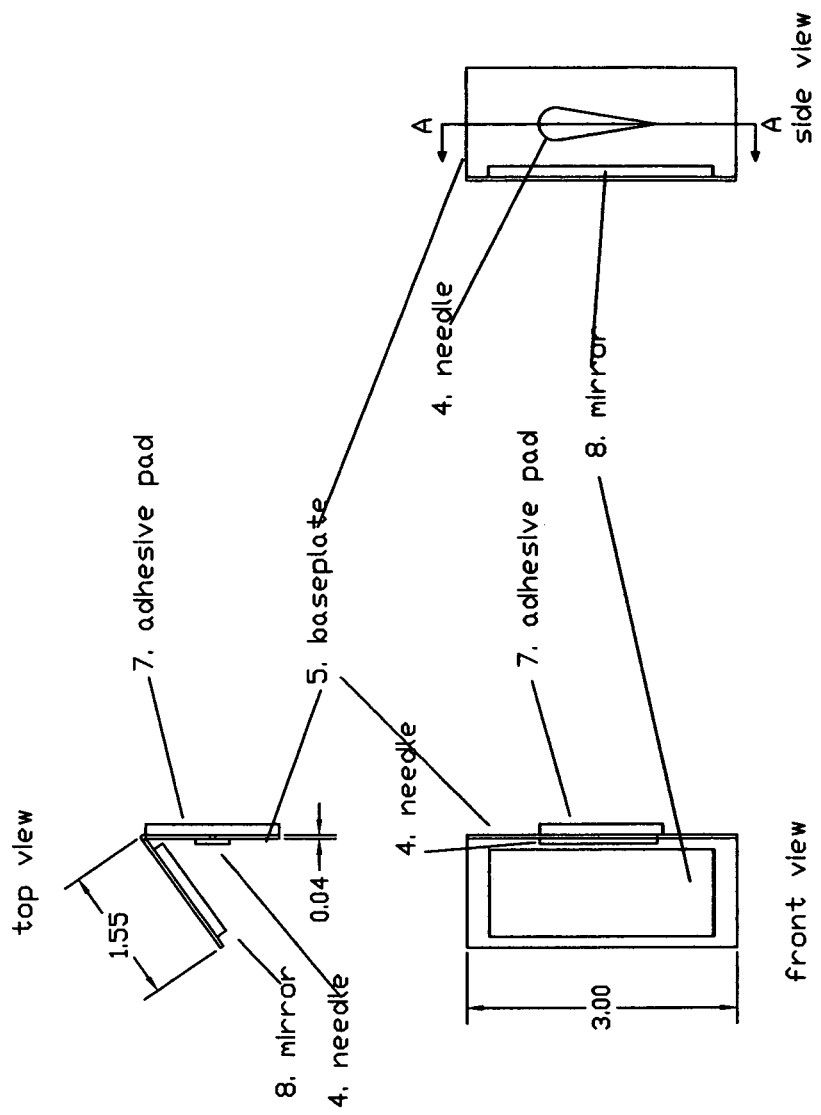

FIG. 2 Orthographic view of the assembly showing the bend of the baseplate, top view, which facilitates reflection of needle position to the operator via the attatched mirror. This bend provides the operator with a SIDE VIEW of the fork mast from the operator position. This is the unique feature of this invention.

FIG. 3 Detail view of section AA FIG. 2, showing baseplate, rivet, axle bushing, spacer bushing, indicator needle, and backup washer. This view shows the gap between the needle and spacer bushing allowing free movement of the indicator needle.

FIG. 4 illustrates the typical installation position of the device on the main mast of material handling equipment. The device is mounted to the outside mast at a level within the line of sight of the operator. As the forks are tilted backward and forward the indicator needle rolls to the positions indicated at right. Note: the text "F" and "B" are actually printed in reverse on the label to reflect proper text orientation in the mirror.

Figure 5:

FIG. 5 shows a detail view of the graduated adhesive label which is placed directly below the indicator needle on the baseplate. With reversed text letters "F" and "B", and a central plumb indicator mark, the fork position with respect to tilt condition can readily be determined by reading indicator needle position relative to the scale. When reflected back toward the operator by the mirror, the text appears normally to the operator.

LIST OF COMPONENT PARTS

1. Rivet
2. Bushing, axle
3. Bushing, spacer
4. Needle, indicator
5. Baseplate
6. Washer, backup
7. Adhesive foam pad
8. Mirror
9. Graduated adhesive lable The embodiments of the invention in which an exclusive or privelege is claimed are defined as follows:

1. A device for providing visual indication of mast side view and therefore mast plumb or tilt condition directly to the operator of forklift material handling equipment, said device comprising:
    a baseplate, said baseplate bent at approximately 45 degrees, standing on end, resembling a partially opened book, and forming two inner surfaces;
    a mirror attached to one of said inner surfaces of the bend;
    an indicator needle on the opposing inner surface of said baseplate and held by a rivet and freely rotating about its axis;

said rivet fitted with an axle bushing and a spacer bushing to provide a gap between said indicator needle and said baseplate allowing free rotation of the indicator needle along its axis.

2. A device as recited in claim 1, further comprising:
a graduated adhesive label imprinted with a reversed "F", several linear graduation markings
and a reversed "B" marking so that when reflected by the mirror, thus providing a clear visual indication of mast vertical and therefore fork level condition.

3. A device as recited in claim 1, further comprising a double sided adhesive pad for securing said device to the forklift mast.

\* \* \* \* \*